(12) United States Patent
Ferri et al.

(10) Patent No.: US 11,338,867 B2
(45) Date of Patent: May 24, 2022

(54) APPLIQUE WITH DEPLOYABLE AERODYNAMIC SURFACE

(71) Applicant: Magna Exteriors Inc., Concord (CA)

(72) Inventors: James J. Ferri, Maple (CA); J. R. Scott Mitchell, Newmarket (CA); Jeffrey Richard F. Domenchini, Etobicoke (CA)

(73) Assignee: MAGNA EXTERIORS, INC., Concord (CA)

( * ) Notice: Subject to any disclaimer, the term of this patent is extended or adjusted under 35 U.S.C. 154(b) by 72 days.

(21) Appl. No.: 16/766,861

(22) PCT Filed: Dec. 26, 2018

(86) PCT No.: PCT/IB2018/060621
§ 371 (c)(1),
(2) Date: May 26, 2020

(87) PCT Pub. No.: WO2019/130218
PCT Pub. Date: Jul. 4, 2019

(65) Prior Publication Data
US 2020/0369331 A1 Nov. 26, 2020

Related U.S. Application Data

(60) Provisional application No. 62/610,600, filed on Dec. 27, 2017.

(51) Int. Cl.
*B62D 35/00* (2006.01)
(52) U.S. Cl.
CPC .................... *B62D 35/007* (2013.01)
(58) Field of Classification Search
CPC .... B62D 35/00; B62D 35/001; B62D 35/002; B62D 35/005; B62D 35/007;
(Continued)

(56) References Cited

U.S. PATENT DOCUMENTS

| 6,666,498 B1 | 12/2003 | Whitten |
| 7,481,482 B2 | 1/2009 | Grave et al. |

(Continued)

FOREIGN PATENT DOCUMENTS

| CN | 102414388 B | * | 9/2015 | ............ E05F 15/619 |
| DE | 102016105081 A1 | | 9/2017 | |

(Continued)

OTHER PUBLICATIONS

European Search Report for application 18894342.7, dated Apr. 13, 2021.

(Continued)

*Primary Examiner* — Lori L Lyjak
(74) *Attorney, Agent, or Firm* — Warn Partners.com

(57) ABSTRACT

A deployable applique assembly for a motor vehicle is provided. The assembly includes a housing having a wall with at least one through opening extending through the wall and a panel configured to overlie at least a portion of the wall when in a stowed position, with an outer surface of the panel being configured to form a smooth surface with a body panel of the motor vehicle. The assembly includes a drive link extending through the at least one through opening and having a first end operatively coupled to the inner surface of the panel and a second end. An actuator has a drive member operably coupled with the second end of the drive link, wherein the actuator is operable to selectively pivot the drive link to move the panel between the stowed position and a deployed position.

28 Claims, 13 Drawing Sheets

(58) Field of Classification Search
CPC ...... B62D 35/008; B62D 35/02; B62D 37/00; B62D 37/02; F15D 1/12; F15D 1/002; F15D 1/003; F15D 1/007; F15D 1/009; Y02T 10/82; B62B 35/007
See application file for complete search history.

(56) References Cited

U.S. PATENT DOCUMENTS

| | | |
|---|---|---|
| 8,944,491 B2 | 2/2015 | Neumann et al. |
| 2013/0076064 A1 | 3/2013 | Smith et al. |
| 2017/0225623 A1 | 8/2017 | Gaylard et al. |

FOREIGN PATENT DOCUMENTS

| | | | |
|---|---|---|---|
| DE | 102017004964 A1 | 11/2018 | |
| FR | 2892993 A1 | 5/2007 | |
| FR | 2892994 A1 | 5/2007 | |
| WO | 2004078564 A1 | 9/2004 | |
| WO | 2005105555 A1 | 11/2005 | |
| WO | WO-2006119746 A1 * | 11/2006 | ........... B62D 35/007 |
| WO | WO-2015191697 A2 * | 12/2015 | ............. B62D 35/02 |
| WO | 2016020424 A1 | 2/2016 | |
| WO | 2017097800 A1 | 6/2017 | |
| WO | 2018109310 A1 | 6/2018 | |

OTHER PUBLICATIONS

Notification of Transmittal of the International Search Report and the Written Opinion of the International Searching Authority for International Application No. PCT/IB2018/060621, dated Apr. 18, 2019.

* cited by examiner

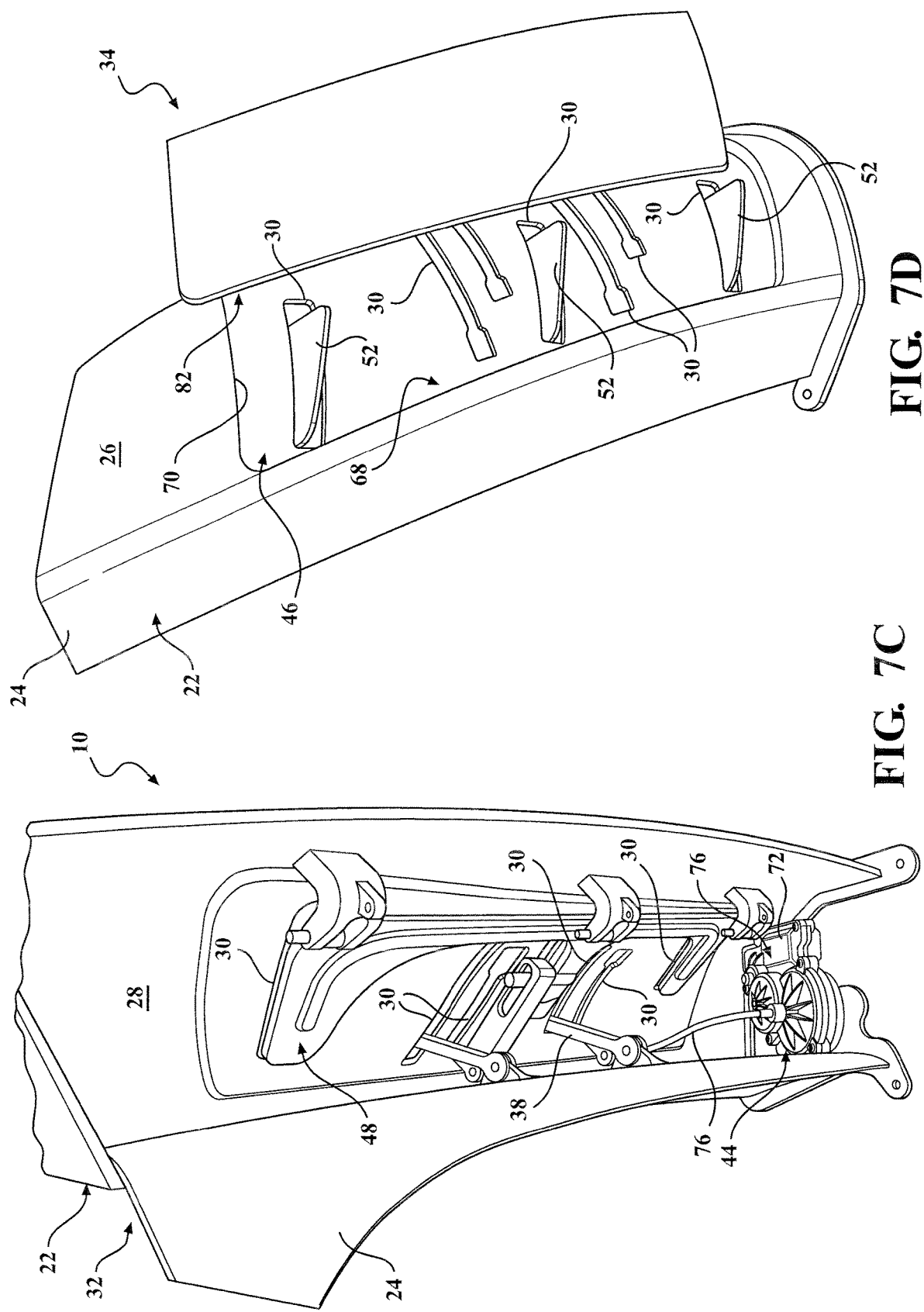

APPLIQUE WITH DEPLOYABLE AERODYNAMIC SURFACE

CROSS-REFERENCE TO RELATED APPLICATIONS

This application claims the benefit of U.S. Provisional Application No. 62/610,600, filed Dec. 27, 2017. The disclosure of the above application is incorporated herein by reference.

FIELD OF THE INVENTION

The present disclosure relates generally to aerodynamic devices for vehicles, and more particularly, to aerodynamic devices for vehicles that are moveable between stowed and deployed positions.

BACKGROUND OF THE INVENTION

This section provides background information related to the present disclosure which is not necessarily prior art.

Vehicles are continually being designed to attain improved fuel economy, particularly in view of ever increasing fuel prices and emissions standards. In an effort to improve fuel economy, the shape of a vehicle is generally taken into consideration to improve its aerodynamics, particularly at highway speeds. It is known that the aerodynamics of vehicle play an important role in increasing fuel economy, and as such, vehicle panels are often contoured to minimize drag. However, in certain types of vehicles, particularly larger vehicles, such as vans, sport utility vehicles, and the like, providing aerodynamic contours and features can prove difficult. Although some advances have been made in contouring the fixed shape of vehicle panels for these types of vehicles, and others, the drag created at the rear of vehicles, known as base drag, remains a problem.

As the air flows along the side of a vehicle and passes beyond the rear side panel, the laminar air flow along the side of the vehicle turns into turbulent air flow behind the vehicle, particularly at highway speeds. Turbulent air flow results from air suddenly separating in uncontrolled fashion from the rear of the vehicle. Turbulent air flow results in a negative pressure (vacuum) at the rear of the vehicle, which in turns results in the base drag force acting as a pulling force on the rear of the vehicle, which in turn ultimately reduces the fuel economy of the vehicle. Spoilers, fins and the like, which protrude outwardly from the surface of vehicles have been met with some success, but they inherently result in increased drag as a result of increasing the vehicle surface area exposed to head-on airflow. In addition, spoilers, fins and the like can prove unsightly.

In view of the above, there remains a need to develop aerodynamic features for vehicles which address and overcome at least those limitations discussed above.

SUMMARY OF THE INVENTION

This section provides a general summary of the present disclosure and is not a comprehensive disclosure of its full scope or all of its features, aspects and objectives.

It is an aspect of the present disclosure to provide an aerodynamic member for a vehicle that can remain in a stowed position during relatively slow vehicle speeds, such as typically encountered in residential and city driving, and that is selectively moveable to a deployed position at increased speeds, such as typically encountered on a highway, so as to provide the vehicle with aerodynamics that ultimately result in increased fuel economy compared to the same vehicle not having such aerodynamic member.

It is a further aspect of the present disclosure to provide the aerodynamic member as having an outer surface with an aesthetically pleasing, outwardly viewable appearance while both in the stowed and deployed positions.

It is a further aspect of the present disclosure to provide the aerodynamic member such that it does not increase or substantially increase the head-on (front) drag of the vehicle when in the stowed and deployed positions.

It is a further aspect of the present disclosure to provide the aerodynamic member such that it remains generally flush with an outer body panel of the vehicle when in the stowed position.

It is a further aspect of the present disclosure to provide the aerodynamic member such that it remains generally flush with an outer body panel of the vehicle when in the deployed position.

It is a further aspect of the present disclosure to minimize the drag of the aerodynamic member while moving from the stowed position to the deployed position at highway speeds such that it remains generally flush with an outer body panel of the vehicle while being moved between the stowed and deployed positions.

It is a further aspect of the present disclosure to provide a plurality of fin members moveable from a retracted, stowed position, hidden from view beneath the aerodynamic member, to an outwardly deployed position concurrently with the movement of the aerodynamic member from the stowed position to the deployed position.

It is a further aspect of the present disclosure to interlink the plurality of fin members operatively with the aerodynamic member such that the fin members move conjointly with the aerodynamic member between their respective stowed positions to their respective deployed positions.

It is a further aspect of the present disclosure to actuate the plurality of fin members and the aerodynamic member conjointly with one another between their respective stowed positions to their respective deployed positions via a common actuator.

In accordance with a further aspect, a deployable applique assembly for a motor vehicle is provided. The assembly includes a housing having a wall with an external surface and an opposite internal surface with at least one through opening extending through said wall and a panel having an outer surface and an inner surface, wherein the inner surface is configured to overlie at least a portion of the external surface of the wall when in a stowed position and the outer surface is configured to face outwardly from a body panel of the motor vehicle for viewing. The assembly further includes a drive link extending through the at least one through opening and having a first end operatively coupled to the inner surface of the panel and a second end. An actuator has a drive member operably coupled with the second end of the drive link, wherein the actuator is operable to selectively pivot the drive link within the through opening to move the panel between the stowed position and a deployed position spaced from the stowed position.

BRIEF DESCRIPTION OF THE DRAWINGS

The present invention will become more fully understood from the detailed description and the accompanying drawings, wherein:

FIG. 7C is a bottom perspective view of the applique assembly of FIG. 2, shown in the deployed position; and FIG. 7D is a top perspective view of the applique assembly of FIG. 2, shown in the deployed position.

DETAILED DESCRIPTION OF THE PREFERRED EMBODIMENTS

The following description of the preferred embodiment is merely exemplary in nature and is in no way intended to limit the invention, its application, or uses.

In general, example embodiments of an assembly 10, which is an actively deployable vehicle applique assembly having a deployable aerodynamic panel, also referred to as surface, constructed in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are described in detail.

Figure 1:
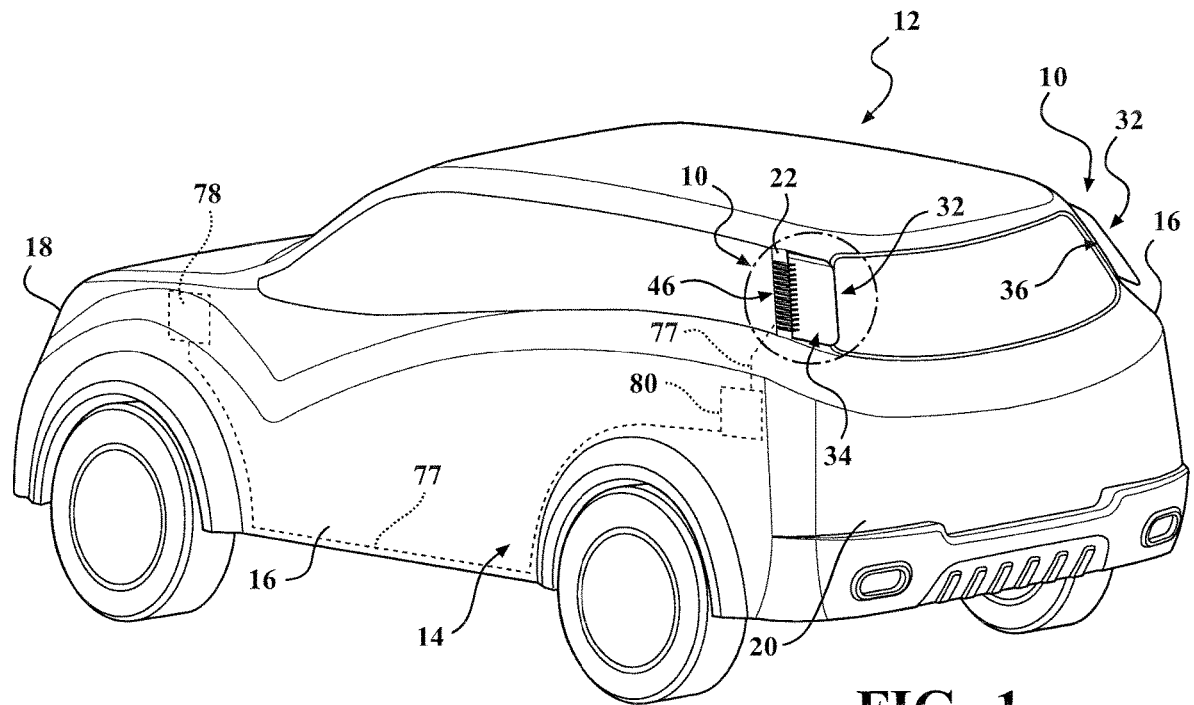
FIG. 1 illustrates an example motor vehicle equipped with an applique assembly having a deployable aerodynamic surface in accordance with one aspect of the disclosure shown in a deployed position.
Figure 1A:
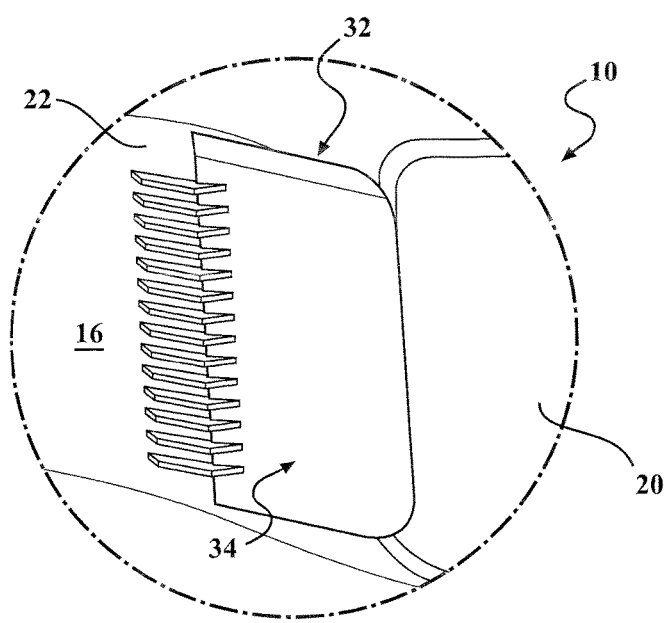
FIG. 1A is a side perspective view of the applique assembly shown in FIG. 1.
Figure 7:
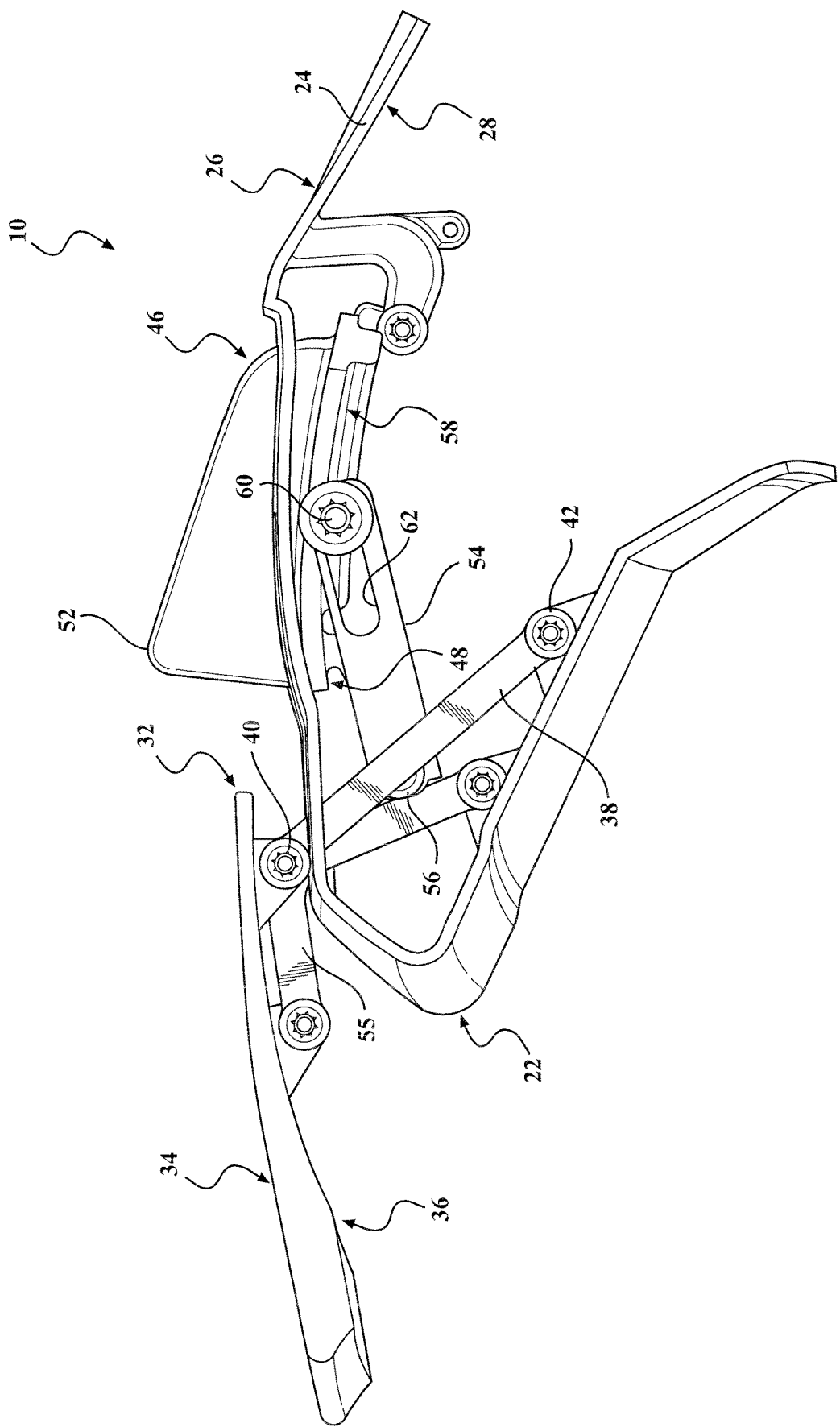
FIG. 7 is view similar to FIG. 6 with the deployable aerodynamic surface shown in a further deployed position and with a vortex fin deployed outwardly from a housing of the applique assembly.
Figure 7A:
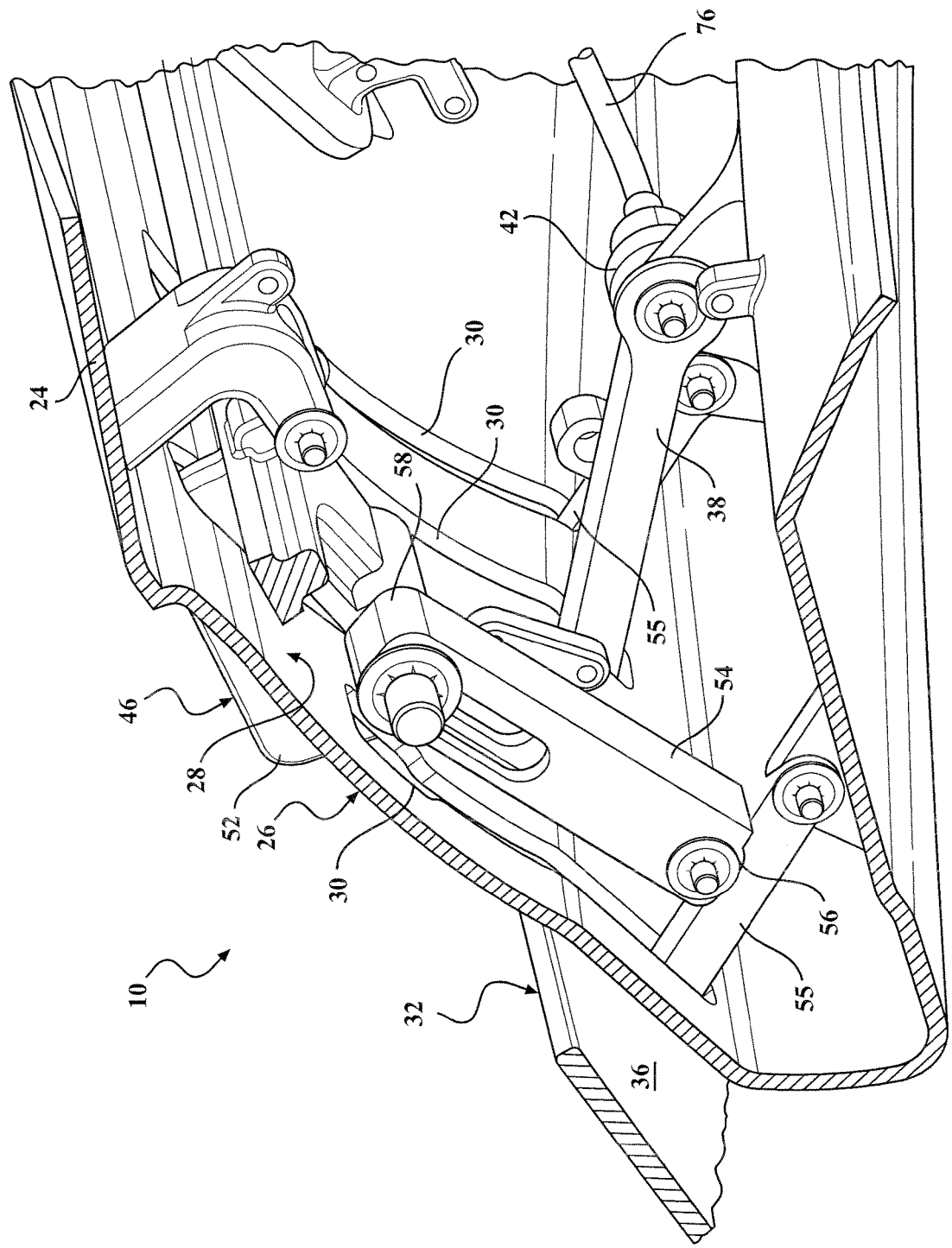
FIG. 7A is a side perspective view of the applique assembly of FIG. 7, shown in the stowed position.
Figure 7B:
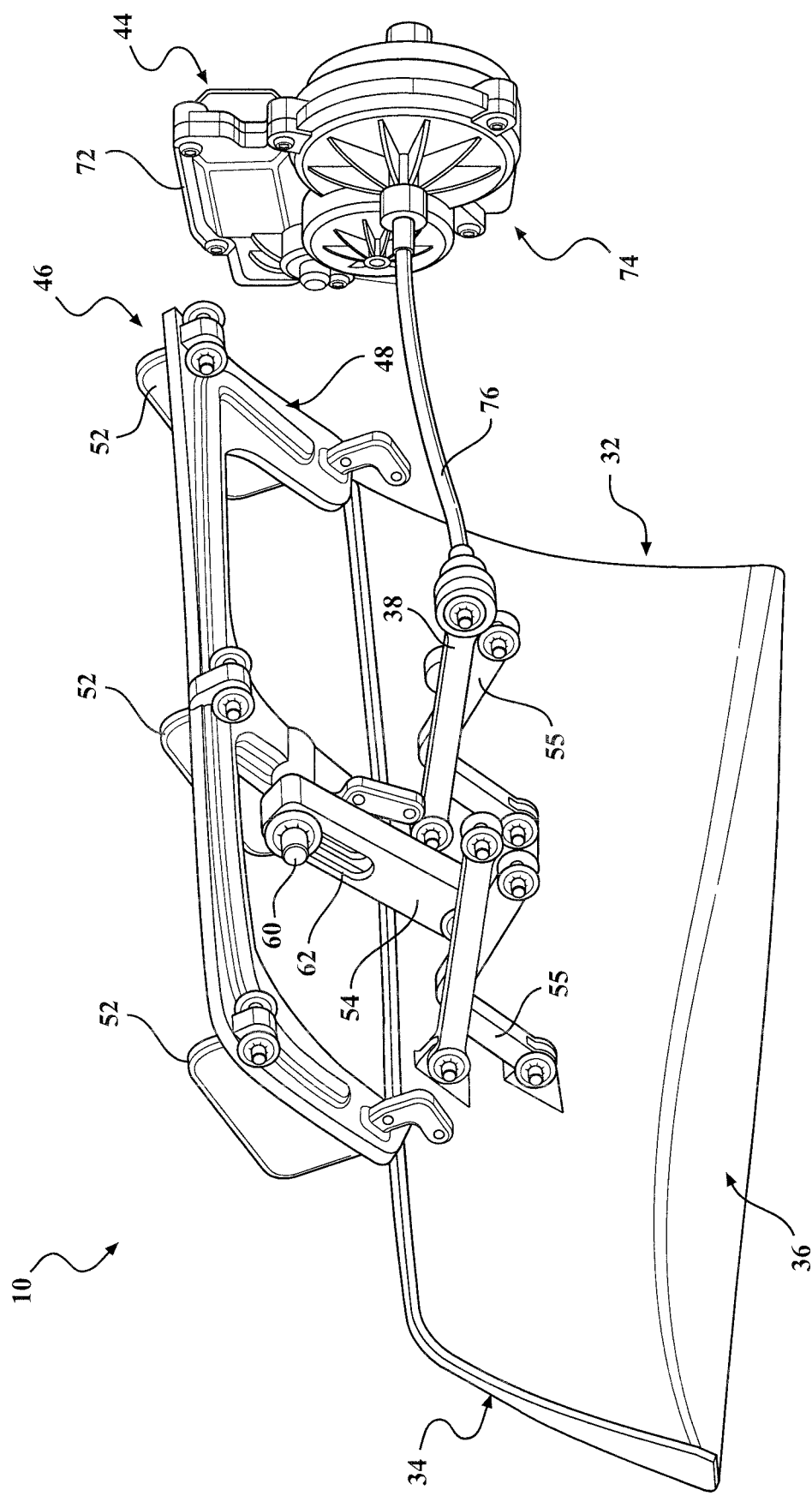
FIG. 7B is a view similar to FIG. 7A with a housing the applique assembly removed.

Referring initially to FIG. 1, an example vehicle 12 is shown to have a vehicle body 14 with opposite side panels 16 (sides) extending between a front end 18 (front) and rear end 20 (rear), wherein the applique assembly, referred to hereafter as assembly 10, is shown disposed, in a deployed position, on the opposite side panels 16 immediately adjacent the rear end 20, such as on a D-pillar of the vehicle. Referring now to all the figures the assembly 10 includes a housing 22 having a sides 23, 24, 25. The housing also include a connecting flange 21 that is used for securing the bottom edge of the housing 22 to the vehicle 12. The housing 22 also has an external surface 26 and an opposite internal surface 28 with at least one through opening, and shown, by way of example and without limitation in FIGS. 2C, 7C and 7D, as a plurality of openings 30 extending through the wall 24. The assembly 10 further includes a deployable panel 32 having an aerodynamic outer surface 34 (facing outwardly as a viewable surface of the vehicle) and an opposite inner surface 36. The inner surface 36 is configured to overlie at least a portion of the external surface 26 of the wall 24 when in a stowed position and the outer surface 34 is configured to face outwardly from a body panel of the vehicle 12 for viewing, shown as the side panels 16, by way of example and without limitation.

The assembly 10 further includes at least one drive link 38 extending through at least one of the through openings 30, wherein the drive link 38 has a first end 40 pivotally coupled to a flange 41 of the inner surface 36 of the panel 32 and a second end 42 to a flange 43 on an inner surface of the wall 24. The assembly 10 further includes an actuator 44 operably coupled with the second end 42 of the drive link 38, wherein the actuator 44 selectively drives (pivots) the drive link 38, within the through opening 30, to deploy the panel 32 from the stowed position (FIGS. 2-2C) to a fully deployed position (FIGS. 7-7D) spaced from the stowed position. It is within the scope of this invention that the actuator 44 is operable to maintain or continually move the panel 32 over an infinite number of select positions between the stowed position and the fully deployed position, depending on the conditions.

Figure 2:
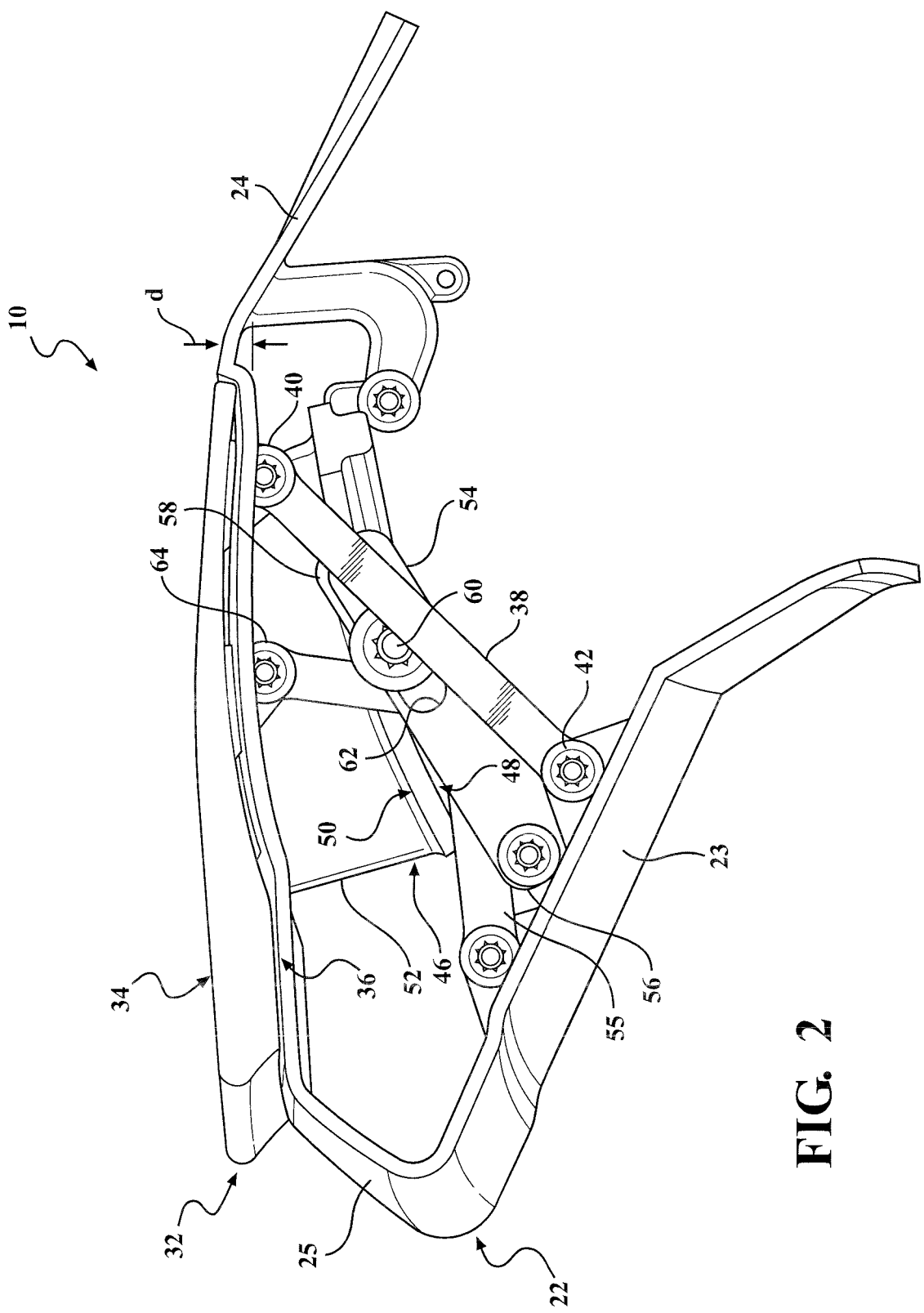
FIG. 2 is a side view of an applique assembly having a deployable aerodynamic surface in accordance with a further aspect of the disclosure, shown in a stowed position.
Figure 2A:
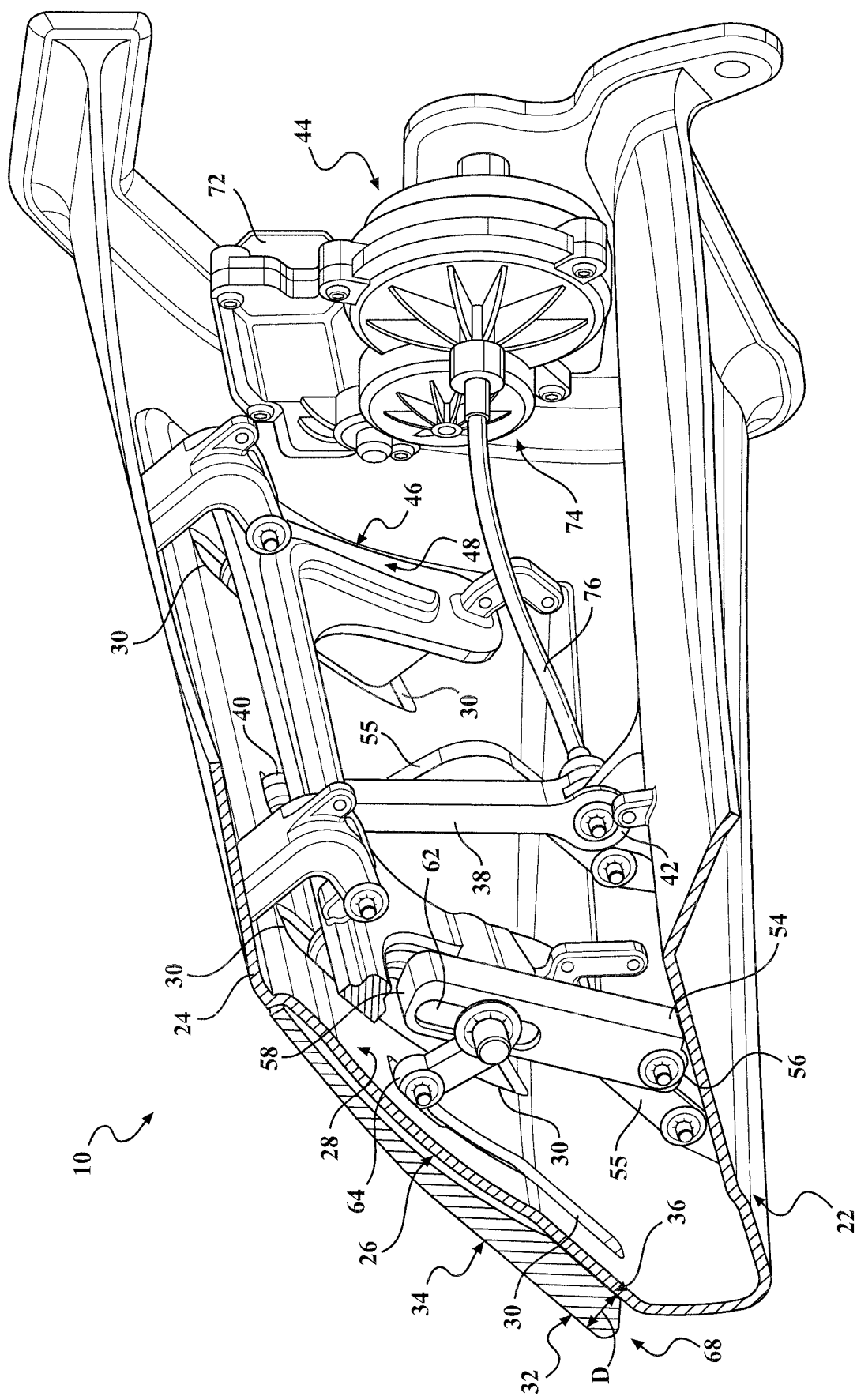
FIG. 2A is a side perspective view of the applique assembly of FIG. 2, shown in the stowed position.
Figure 2C:
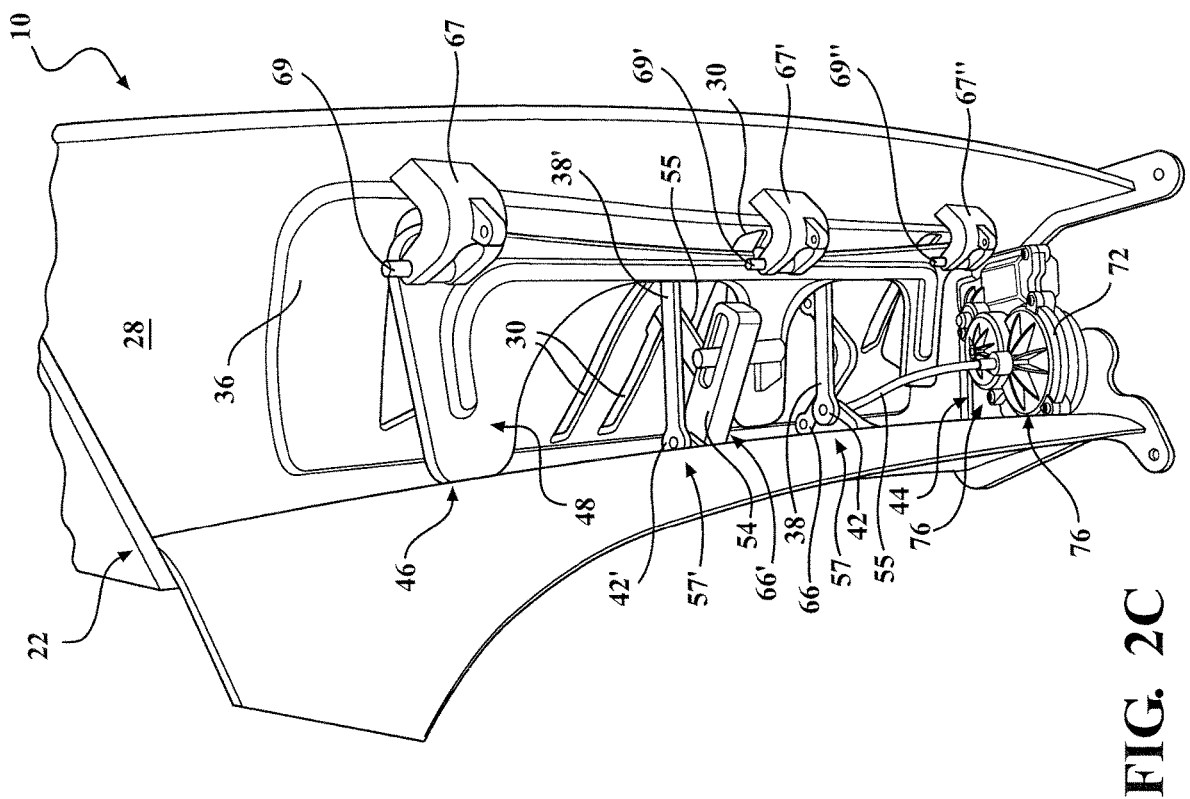
FIG. 2C is a bottom perspective view of the applique assembly of FIG. 2, shown in the stowed position.
Figure 2B:
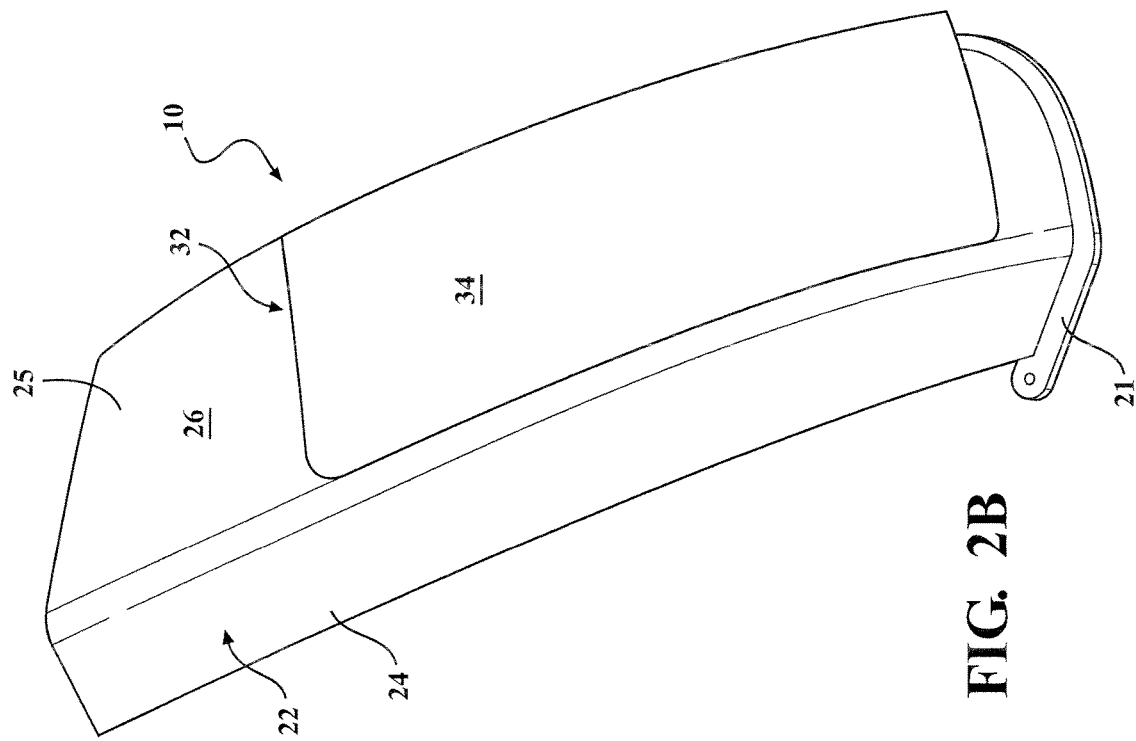
FIG. 2B is a top perspective view of the applique assembly of FIG. 2, shown in the stowed position.
Figure 3:
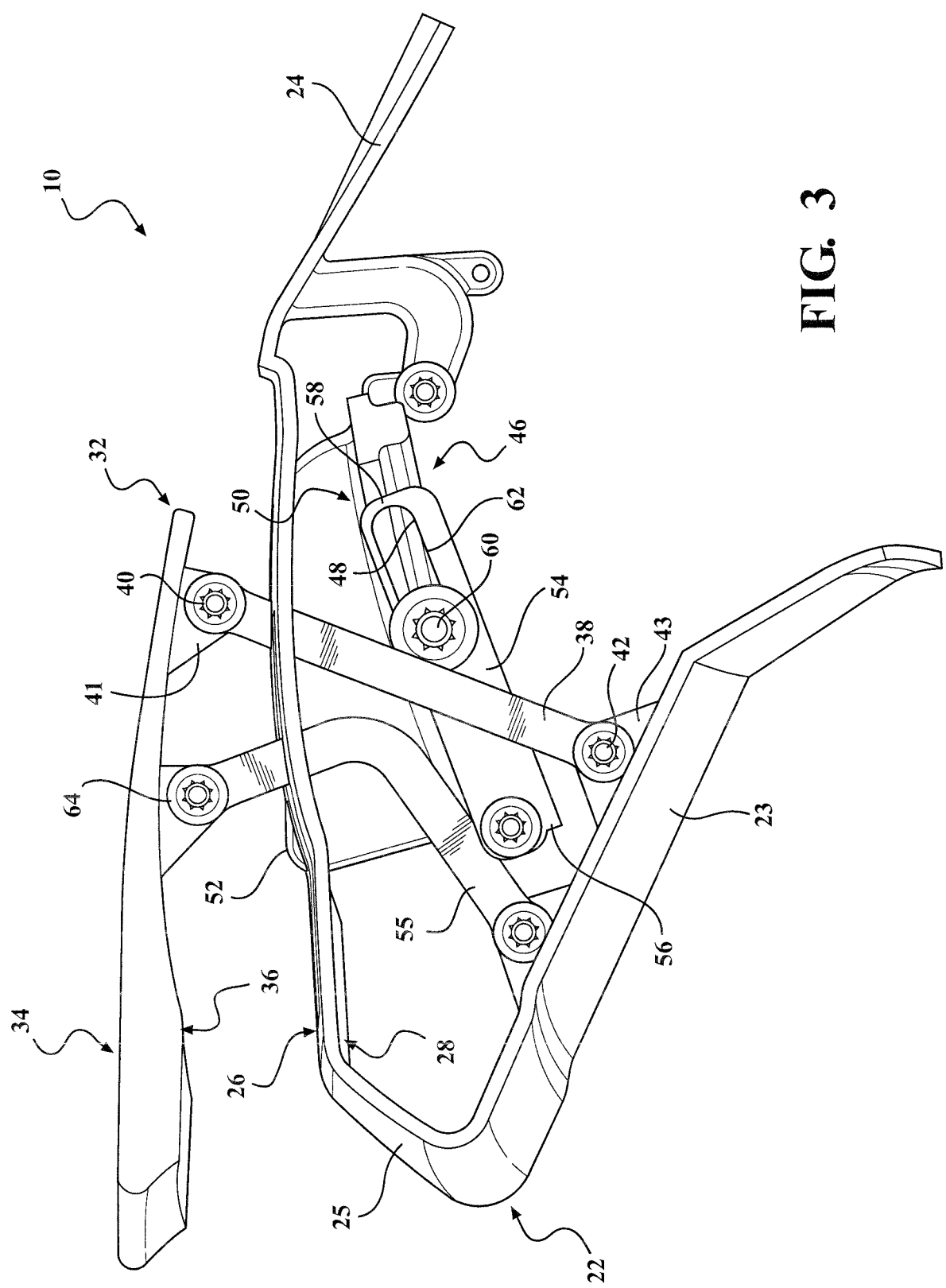
FIG. 3 is a side view of the applique assembly of FIG. 2 with the deployable aerodynamic surface shown in a partially deployed position.
Figure 4:
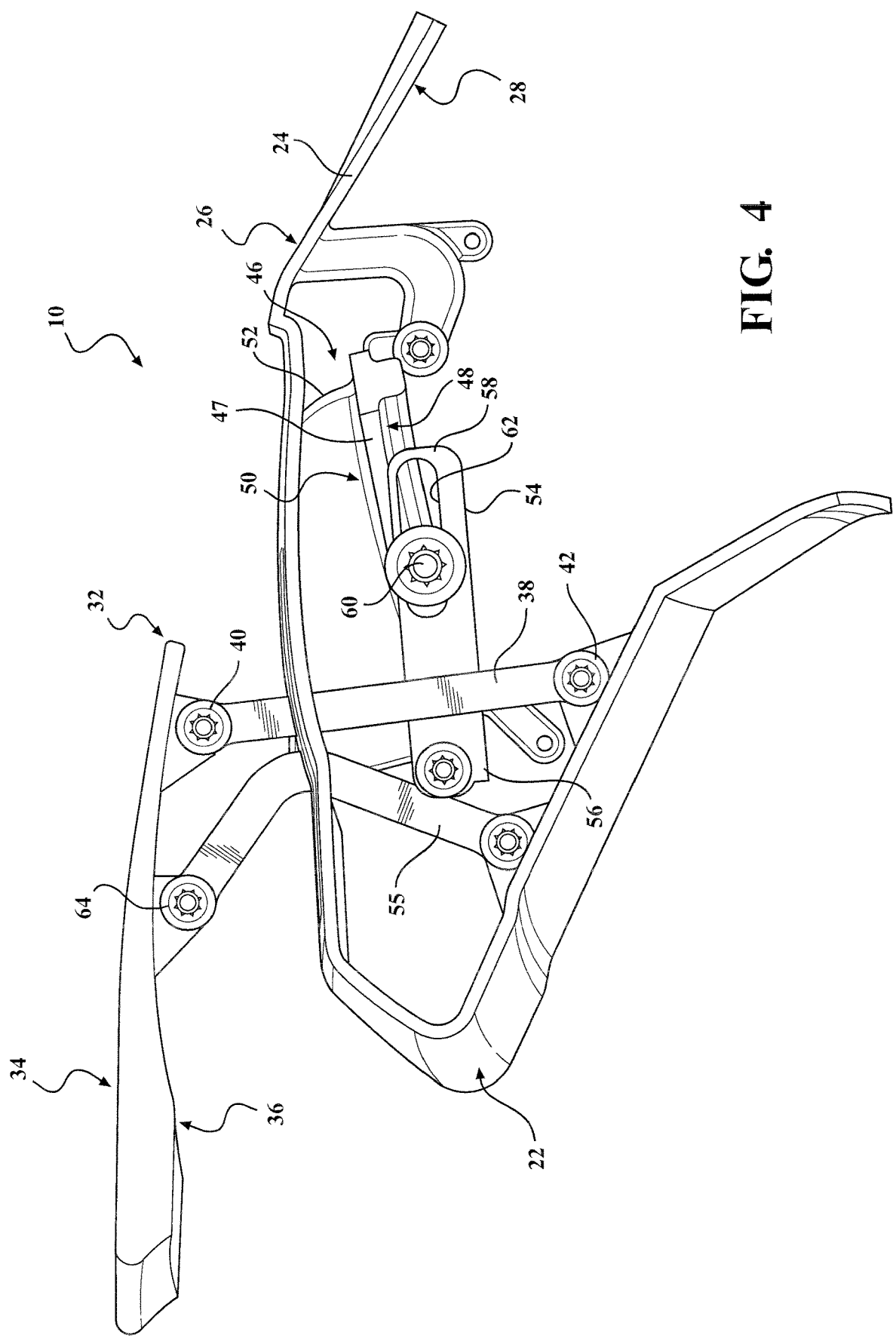
FIG. 4 is view similar to FIG. 3 with the deployable aerodynamic surface shown in a further deployed position.
Figure 4A:
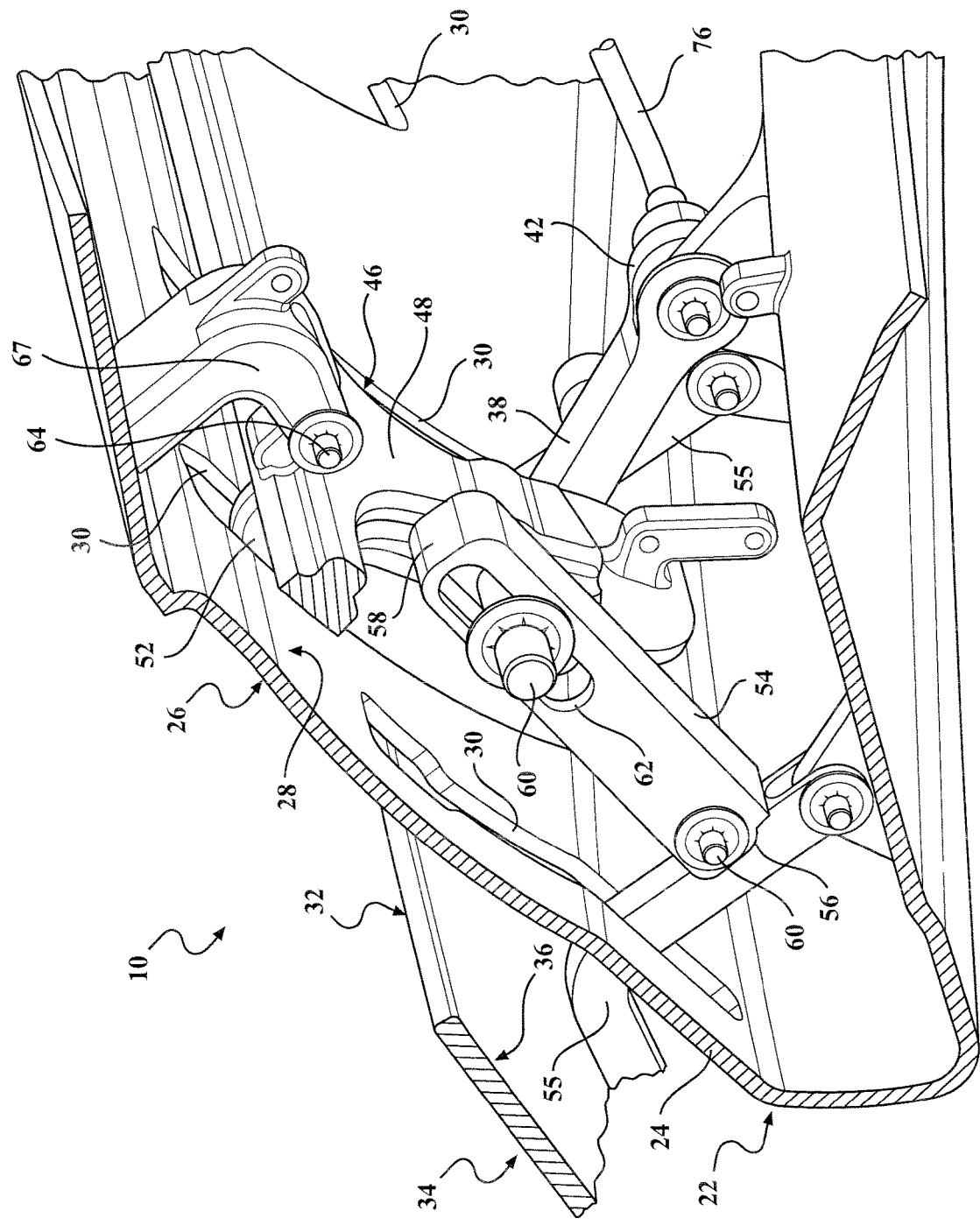
FIG. 4A is a side perspective view of the applique assembly of FIG. 4.
Figure 5:
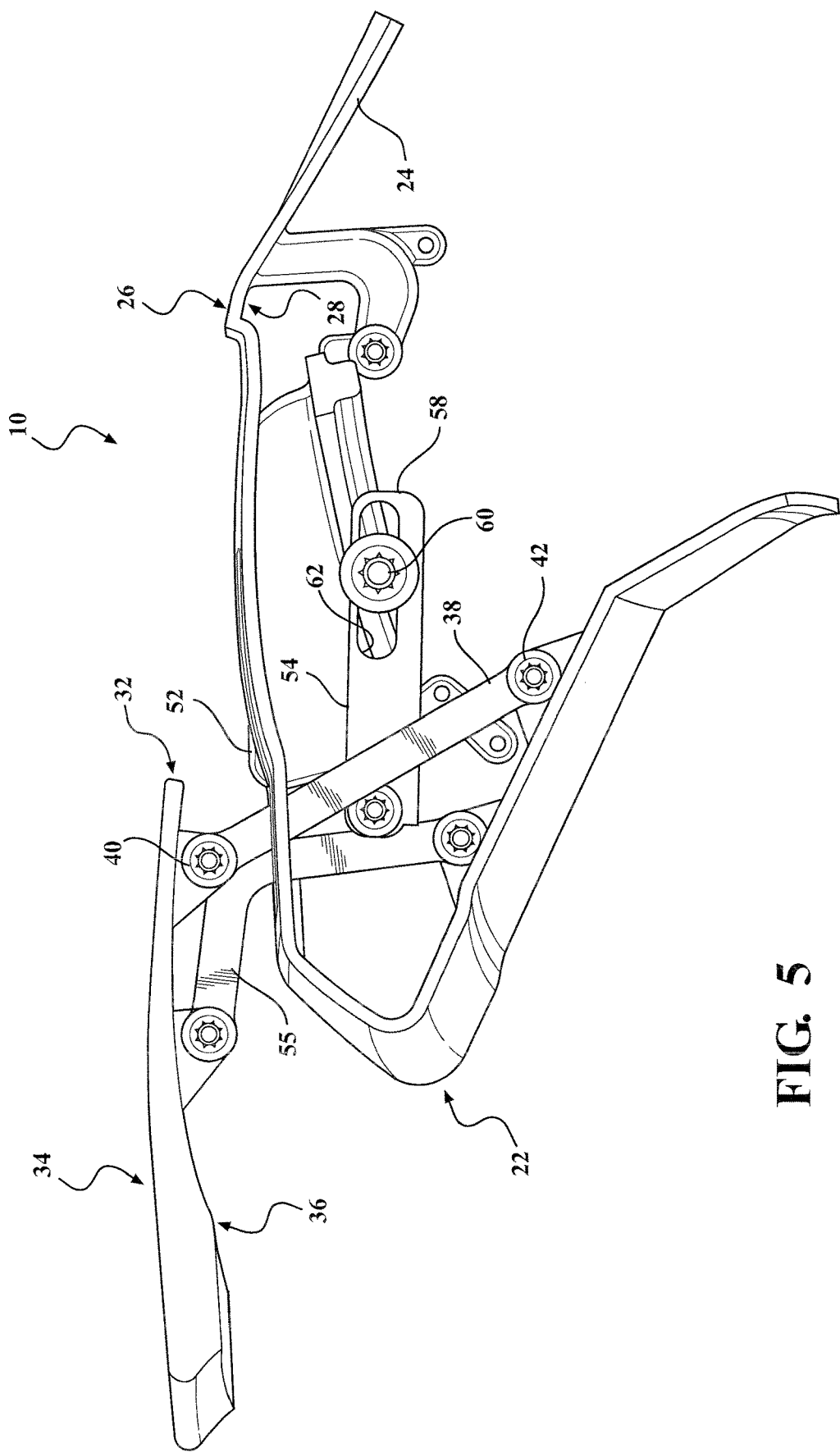
FIG. 5 is view similar to FIG. 4 with the deployable aerodynamic surface shown in a further deployed position.
Figure 6:
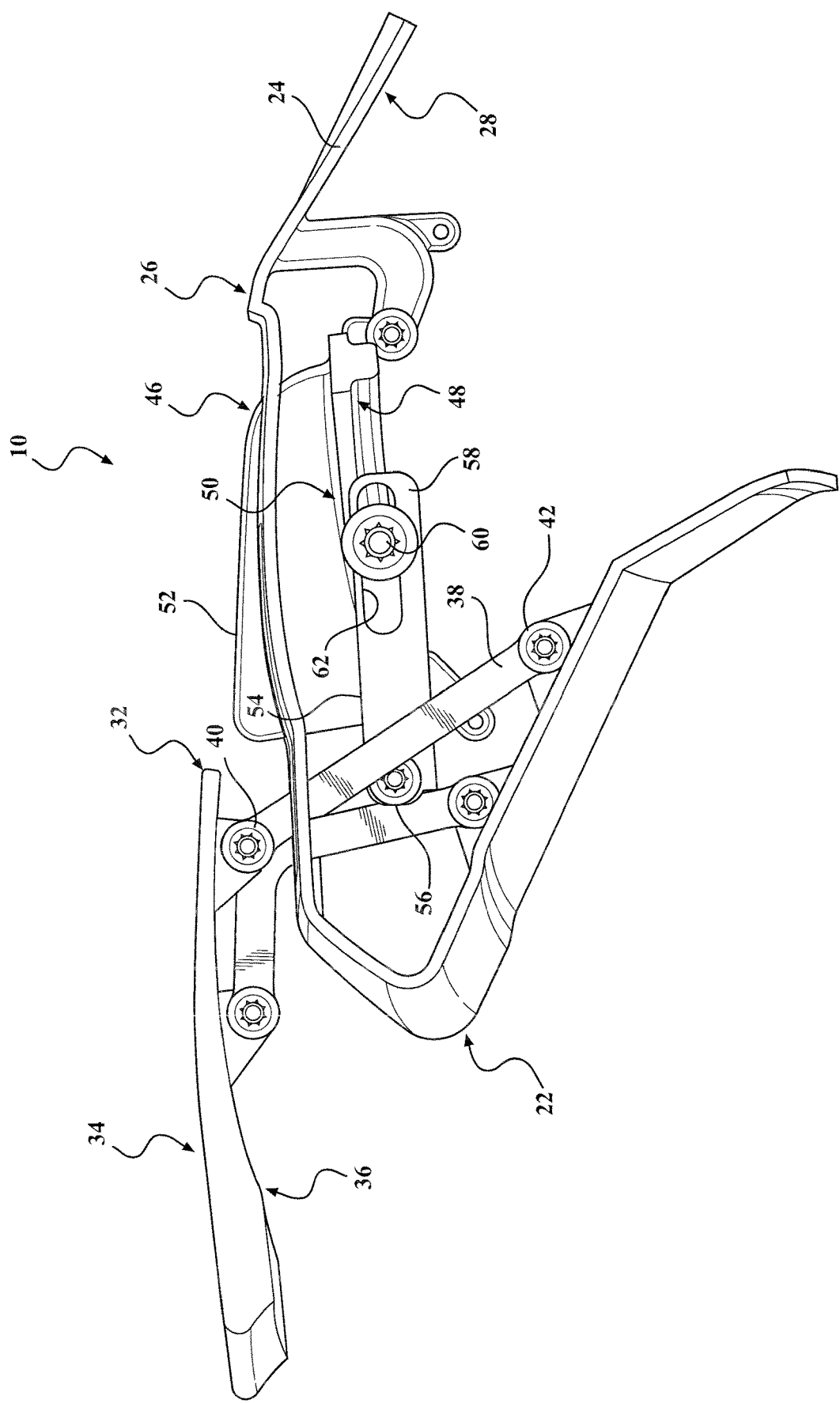
FIG. 6 is view similar to FIG. 5 with the deployable aerodynamic surface shown in a further deployed position and with a vortex fin emerging outwardly from a housing of the applique assembly.

The assembly 10 is further shown in a non-limiting embodiment as including a vortex member 46 has a body 47 with an inner face 48 and an outer face 50 with at least one protrusion, also referred to as a plurality of fins 52 that extend outwardly from the outer face 50. The vortex member 46 is moveable from a retracted, stowed position such that the vortex member 46 is concealed beneath the panel 32 beneath the wall of the housing 22 as shown in FIGS. 2-2C. The plurality of fins 52 are moveable outwardly to a visibly deployed, active position, so the plurality of fins 52 pass through the respective openings and extend above the external surface 26 of the wall 24 of the housing 22. When the vortex member 46 are in the deployed position they act to form the desired flow of air there over to promote laminar air flow.

Movement of the vortex member 46 occurs concurrently and conjointly with the movement of the panel from 32 from its stowed position to its deployed position, via the actuator 44 selectively pivoting the drive link 38. The concurrent movement results due to the incorporation of a driven link 54 that is operably coupled to the vortex member 46 and operably driven via selective movements of the drive link 38. The driven link 54 extends between a first end 56 and a second end 58, and is shown, in a non-limiting embodiment, as being operably coupled to one of a plurality of stabilizer links 55 for pivotal movement relative thereto at the first end 56 and is operably coupled to the vortex member 46, via a pin 60, which is shown, by way of example and without limitation, as being fixed to the vortex member 46. The pin 60 extends from fixed attachment to the vortex member 46 for sliding receipt within a slot 62 formed between the ends 56, 58 of the driven link 54. The body 47 of the vortex member is pivotally connected to a plurality of arms 67, 67', 67" that are formed as part of the housing 22, and extend from the internal surface 28. A pin 69, 69', 69" extends through each of the plurality of arms 67, 67', 67" and an aperture (not shown) in the body 47 to create an axis about which the body 47 of the vortex member 46 pivots.

As the vortex member 46 moves from its stowed position to its deployed position, the fins 52 are moved upwardly into the passing air to establish the desired air flow, wherein it is to be recognized the fins 52 can be shaped as desired to establish the desired vortex air flow thereover to generate a turbulent boundary layer and to promote attachment of the airflow to the outer surface 34 downstream from fins 52. The fins 52 move from being concealed beneath the internal surface 28 of the wall 24 upwardly through the through openings 30, wherein each fin 52 is shown as extending through a separate through opening 30, by way of example and without limitation. Accordingly the through openings can be formed to allow a close, slight clearance fit with the fins 52, thereby acting to prevent the ingress of air flow and debris therethrough. It is further contemplated herein that seal members, such as annular seal lips (not shown) could be provided about the periphery of the through openings 30 to facilitate forming a barrier to the ingress of air flow and debris.

As shown in FIG. 2C, a four-bar linkage is provided to facilitate deployment and retraction of the panel 32 and vortex member 46. The four-bar linkage is provided via a pair of the drive links 38, 38'. One of the drive link 38 is directly coupled to the actuator 44. Each of the drive links 38, 38' is paired with a respective one of a pair of the stabilizer links 55, 55' to form opposite side links 57, 57' of the four-bar linkage. The panel 32 is connected at each side link 57, 57' forming a "coupler link" of the four bar linkage. The wall 24, being operably coupled to an opposite respective end 65, 65', 66, 66' of each of the drive and stabilizer links 38, 38', 55, 55' forms a "frame link".

The drive links 38, 38' are shown as being generally or substantially straight (meaning they can be truly straight or slightly less that truly straight), while the stabilizer links 55, 55' are shown as being generally or substantially L-shaped (meaning they can be truly L-shaped or slightly less that truly L-shaped), by way of example and without limitation. The L-shape of the stabilizer links 55 allows the through openings 30 to be reduced in length, thereby minimizing the possibility of water or debris from entering the housing 22. Of course, the stabilizer links 55, 55' could be straight, though it would require lengthening the corresponding through openings 30. Accordingly, it is to be recognized that the elongate shape of the respective links can be other that shown. It will further be understood that the coupled relations between the links 38, 38', 55, 55' and the panel 32/housing 22 attached thereto can be made via pivotal connections, such as via pinned couplings or the like, thereby providing the necessary degrees of freedom between the coupled components for relative pivoting movement.

To facilitate forming a smooth, generally flush outer surface of the vehicle body 14, to enhance aesthetics which can be readily viewed by a user to enhance providing a streamline, aerodynamic surface, the external surface 26 of the housing 22 can be formed having a recessed surface, also referred to as pocket 68, configured for receipt of the panel 32 therein. As such, the shape of an outer periphery 70 and depth (D) of the pocket 68 can be formed such that when the panel 32 is retracted to its fully stowed position, a smooth, generally seamless outwardly facing surface of the vehicle body, shown as the side panels 16, is formed. Of course, depth (D) can vary as desired to accommodate a varying thickness of the panel 32, and the outer surface 34 of the panel 32 can be formed having any desired aesthetic appearance and contour, as desired.

The actuator 44 can be provided as any desired actuator capable of selectively deploying and retracting the panel 32 between the stowed and deployed positions, and in accordance with one aspect, is provided as an electric motor 72 operably connected, such as via an intermediate gear train 74, to a drive member, shown as a flexible drive shaft 76. It will be understood that any suitable coupling between the drive shaft 76 and the drive link 38 can be implemented to cause conjoint pivoting, oscillating movement of the drive link 38 depending on the direction of rotation of the drive shaft 76. Accordingly, rotation of the drive shaft 76 in one direction causes corresponding pivoting movement of the drive link 38 in the same direction, and rotation of the drive shaft 76 in an opposite direction causes corresponding pivoting movement of the drive link 38 in the same direction.

The panel 32 and vortex member 46 are selectively deployable and retractable as needed to establish the desired laminar airflow about the rear end 20 of the vehicle 12. To facilitate automated deployment/retraction, the assembly 10 can be configured in operable, electrical communication via an electrical connection 77 with an electronic control unit (ECU) 78 or body control unit (BCM), which in turn can be configured in electrical communication via an electrical connection 77 with a sensor 80, such as anemometer, to other speed sensor, such as a speedometer or connection to the ECU/BCM (having data about the vehicle speed acquired from various sensor(s)), by way of example and without limitation, wherein the assembly 10 can be further configured to deploy above or retract below a predetermined speed threshold. Accordingly, the electronic control unit 78 can be configured to receive information, such a wind speed, wind direction, type of airflow (laminar or turbulent) from the sensor 80, and in turn, can selectively actuate the electric motor 72 to drive the panel 32 between the desired stowed and deployed positions, wherein the panel 32 can be deployed to an infinite number of positions between the stowed and fully deployed positions to establish an optimal airflow about the rear end 20 of the vehicle to minimize the base drag (low pressure) behind the vehicle 12, thereby enhancing the fuel economy of the vehicle.

In use, when the vehicle 12 is stationary or traveling at relatively slow speeds, such as in a residential neighborhood or in a city, such that the wind speed about the rear end of the vehicle remains laminar or substantially laminar (attached to the rear end 20), the panels 32 can remain in their stowed positions, thereby remaining flush with the side panels 16 and with the rear end 20. Accordingly, with the assembly 10 in the non-deployed state, and the panels 32 and vortex members 46 are in their stowed positions, the vehicle 12 takes on a "normal" appearance. Then, when the vehicle 12 is being driven at relatively increased speeds, such as along a highway, such that the wind speed about the rear end of the vehicle becomes unstable and turbulent (detached from the rear end 20), the panels 32 and vortex members 46 can be conjointly deployed, as commanded by the electronic control unit 78 via signals from the sensor(s) 80, via selective actuation of the motor 72 and drive shaft 76. As the panels 32 are being moved from their stowed positions toward their deployed positions, the four-bar linkage keeps the panels 32 in relatively close relation to the side panels 16, thereby minimizing a head-on drag forces from wind flowing about the panels 32. Further, the driven links 54 are simultaneously moved to move the vortex members 46 to their deployed positions, with the fins 52 be driven outwardly through their respective through openings 30. When the panels 32 and vortex members 46 are in their fully deployed positions, the outer surfaces 34 and outer faces 50 thereof are brought into flush or substantially flush relation with the vehicle side panels 16, thus preventing head-on drag. Further, the panels 32 are extended rearwardly of the rear end 20 to prevent or inhibit the separation of the airflow from the vehicle rear end 20. The panels 32 can be shaped to form a tear drop configuration rearwardly from the rear end 20, if desired, or they could be shaped otherwise, including having flat or substantially flat outer surfaces 34 oriented to extend inwardly in converging relation with one another, if desired. Accordingly, the onset of air turbulence is prevented or greatly reduced from that if the panels 32 were not deployed. Of course, when the vehicle 12 slows, the panels 32 and vortex members 46 are automatically retracted to their respective stowed positions via detection from the sensors 80 and associated commands from the electronic control unit 78 and actuation of the motor 72 and drive shaft 76. It is to be understood that selective actuation of the assembly 10 as commanded by the user of the vehicle 12 is contemplated herein, should, for any reason, the user wish to have the panels 32 and vortex members 46 deployed or stowed. Accordingly, the assembly 10 can be actuated directly by the user, such as via a switch or button with a cabin of the vehicle, as desired.

It will be readily appreciated and understood by the skilled artisan, upon viewing the disclosure herein, that assembly, including the panel 32 and vortex member 46, can be configured, shaped and contoured as desired, and that the foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A deployable applique assembly for a motor vehicle, comprising:
    a housing having a wall with an external surface and at least one through opening extending through said wall;
    a panel configured to overlie at least a portion of said external surface of said wall when in a stowed position;
    a drive link extending through said at least one through opening and having a first end operatively coupled to an inner surface of said panel and a second end;
    an actuator within said housing and connected to said second end of said drive link, said actuator selectively moves said drive link within said through opening to move said panel between said stowed position and a deployed position spaced from said stowed position, and
    a vortex member having an inner face and an outer face with at least one fin extending outwardly from said outer face, said vortex member being moveable from a retracted, stowed position beneath said panel to an outwardly visibly deployed position concurrently with the movement of said panel from the stowed position to said deployed position via said actuator selectively pivoting said drive link.

2. The deployable applique assembly claim 1, wherein said vortex member includes a plurality of said at least one fin.

3. The deployable applique assembly claim 2, wherein said housing has a plurality of said at least one through opening, wherein each of said fins extends through a separate one of said through openings.

4. The deployable applique assembly of claim 3, wherein said drive link extends through a separate one of said through openings from said fins.

5. The deployable applique assembly of claim 1, further including a driven link connected to the vortex member, wherein the driven link is driven by movement of the drive link.

6. The deployable applique assembly of claim 5, wherein said driven link has an elongate slot, and further including a pin extending in fixed relation from said vortex member into sliding receipt within said slot.

7. The deployable applique assembly of claim 1, wherein said second end of said drive link is operatively coupled to said housing, and further including a stabilizer link having a first end operatively coupled to said inner surface of said panel and a second end operatively coupled to said housing, said drive link and said stabilizer link forming a four-bar link with said panel and said housing.

8. The deployable applique assembly of claim 7, wherein said drive link is substantially straight and said stabilizer link is generally L-shaped.

9. The deployable applique assembly of claim 1, wherein said external surface of said housing has a recessed pocket bounded by an outer periphery, said panel being configured for receipt in said recessed pocket with an outer surface of said panel being generally flush with said outer periphery while said panel is in said stowed position.

10. The deployable applique assembly of claim 1, wherein said actuator includes an electric motor operably coupled to said second end of said drive link via a flexible drive member.

11. The deployable applique assembly of claim 10, wherein said electric motor is configured in operable communication with an electronic control unit, said electronic control unit being configured to indicate when to selectively actuate said electric motor to drive said panel between said stowed and deployed positions.

12. The deployable applique assembly of claim 11, wherein said electronic control unit is in communication with a sensor, said sensor being configured to indicate to said electronic control unit when to actuate said electric motor.

13. The deployable applique assembly of claim 1, wherein said panel is configured to be generally flush with a body panel of a motor vehicle when the panel is in the stowed position and when the panel is in the deployed position, the panel extends rearwardly of a rear surface of the motor vehicle.

14. The deployable applique assembly of claim 13, wherein said panel is configured to be generally flush with the body panel of the motor vehicle when the panel is in the deployed position.

15. A deployable applique assembly for a motor vehicle, comprising:
a housing having a wall with an external surface and an opposite internal surface with at least one through opening extending through said wall;
a panel having an outer surface and an inner surface, said inner surface being configured to overlie at least a portion of said external surface of said wall when in a stowed position and said outer surface being configured to face outwardly from a body panel of a motor vehicle for viewing;
a drive link extending through said at least one through opening and having a first end operatively coupled to said inner surface of said panel and a second end;
an actuator operably coupled with said second end of said drive link, said actuator being operable to selectively pivot said drive link within said through opening to move said panel between said stowed position and a deployed position spaced from said stowed position, and
a vortex member having an inner face and an outer face with at least one fin extending outwardly from said outer face, said vortex member being moveable from a retracted, stowed position beneath said panel to an outwardly visibly deployed position concurrently with the movement of said panel from the stowed position to the deployed position via said actuator selectively pivoting said drive link.

16. The deployable applique assembly claim 15, wherein said vortex member includes a plurality of said at least one fin.

17. The deployable applique assembly claim 16, wherein said housing has a plurality of said at least one through opening, wherein each of said fins extends through a separate one of said through openings.

18. The deployable applique assembly of claim 17, wherein said drive link extends through a separate one of said through openings from said fins.

19. The deployable applique assembly of claim 15, further including a driven link connected to the vortex member, wherein the driven link is driven by movement of the drive link.

20. The deployable applique assembly of claim 19, wherein said driven link has an elongate slot, and further including a pin extending in fixed relation from said vortex member into sliding receipt within said slot.

21. The deployable applique assembly of claim 15, wherein said second end of said drive link is operatively coupled to said housing, and further including a stabilizer link having a first end operatively coupled to said inner surface of said panel and a second end operatively coupled to said housing, said drive link and said stabilizer link forming a four-bar link with said panel and said housing.

22. The deployable applique assembly of claim 21, wherein said drive link is substantially straight and said stabilizer link is generally L-shaped.

23. The deployable applique assembly of claim 15, wherein said external surface of said housing has a recessed pocket bounded by an outer periphery, said panel being configured for receipt in said recessed pocket with said outer surface of said panel being generally flush with said outer periphery while said panel is in said stowed position.

24. The deployable applique assembly of claim 15, wherein said actuator includes an electric motor operably coupled to said second end of said drive link via a flexible drive member.

25. The deployable applique assembly of claim 24, wherein said electric motor is configured in operable communication with an electronic control unit, said electronic control unit being configured to indicate when to selectively actuate said electric motor to drive said panel between the stowed position and the deployed position.

26. The deployable applique assembly of claim 25, wherein said electronic control unit is in operable communication with a sensor, said sensor being configured to indicate to said electronic control unit when to actuate said electric motor.

27. The deployable applique assembly of claim 15, wherein said panel is configured to be generally flush with the body panel of the motor vehicle and with a rear surface of the motor vehicle when the panel is in the stowed position and the panel extends rearwardly of the rear surface of the motor vehicle when the panel is in the deployed position.

28. The deployable applique assembly of claim 27, wherein said panel is configured to be generally flush with the body panel of the motor vehicle when the panel is in the deployed position.

* * * * *